US 6,711,993 B2

(12) United States Patent
Robertson

(10) Patent No.: US 6,711,993 B2
(45) Date of Patent: Mar. 30, 2004

(54) CAMP STOVE AND BARBEQUE SYSTEM

(76) Inventor: Kevin W. Robertson, 1050 E. Imperial Hwy., Apartment A4, Placentia, CA (US) 92870

( * ) Notice: Subject to any disclaimer, the term of this patent is extended or adjusted under 35 U.S.C. 154(b) by 43 days.

(21) Appl. No.: 10/201,748

(22) Filed: Jul. 23, 2002

(65) Prior Publication Data
US 2004/0016349 A1 Jan. 29, 2004

(51) Int. Cl.[7] .............................. A47J 37/00; F24B 3/00
(52) U.S. Cl. ............................. 99/448; 99/449; 99/450; 126/9 R; 126/30; 126/25 A
(58) Field of Search .................... 99/448, 449, 450; 126/9 R, 9 B, 25 A, 30, 25 AA, 50, 25 R; 248/156, 125.7

(56) References Cited

U.S. PATENT DOCUMENTS

| | | |
|---|---|---|
| 366,833 A | 7/1887 | Hipwell |
| 4,024,851 A | 5/1977 | Boda |
| 4,120,280 A | 10/1978 | Iverson et al. |
| 4,146,010 A | 3/1979 | Manska |
| 4,726,349 A * | 2/1988 | Gehrke ..................... 126/25 R |
| 4,732,138 A * | 3/1988 | Vos ............................. 99/450 |
| 5,025,715 A | 6/1991 | Sir |
| D337,933 S | 8/1993 | Gryz |
| 5,850,829 A * | 12/1998 | Taylor et al. .................. 126/30 |

* cited by examiner

Primary Examiner—Reginald L. Alexander
(74) Attorney, Agent, or Firm—Stetina Brunda Garred Brucker

(57) ABSTRACT

A barbeque system having at least three legs and a variety of components selectively attached thereto, such as a grill surface, a warming rack, a heat source, a potholder, and a utensil arm. Food can be cooked on the grill surface, pots containing food can be heated on the potholder, and food can be warmed on the warming rack. The utensil arm provides a convenient place to position cooking utensils when not in use. The height of the heat source and the warming rack can be adjusted to allow control over the cooking heat. The barbeque system is collapsible and can be contained within a carrying case so that the barbecue system can be easily stored or transported.

11 Claims, 5 Drawing Sheets

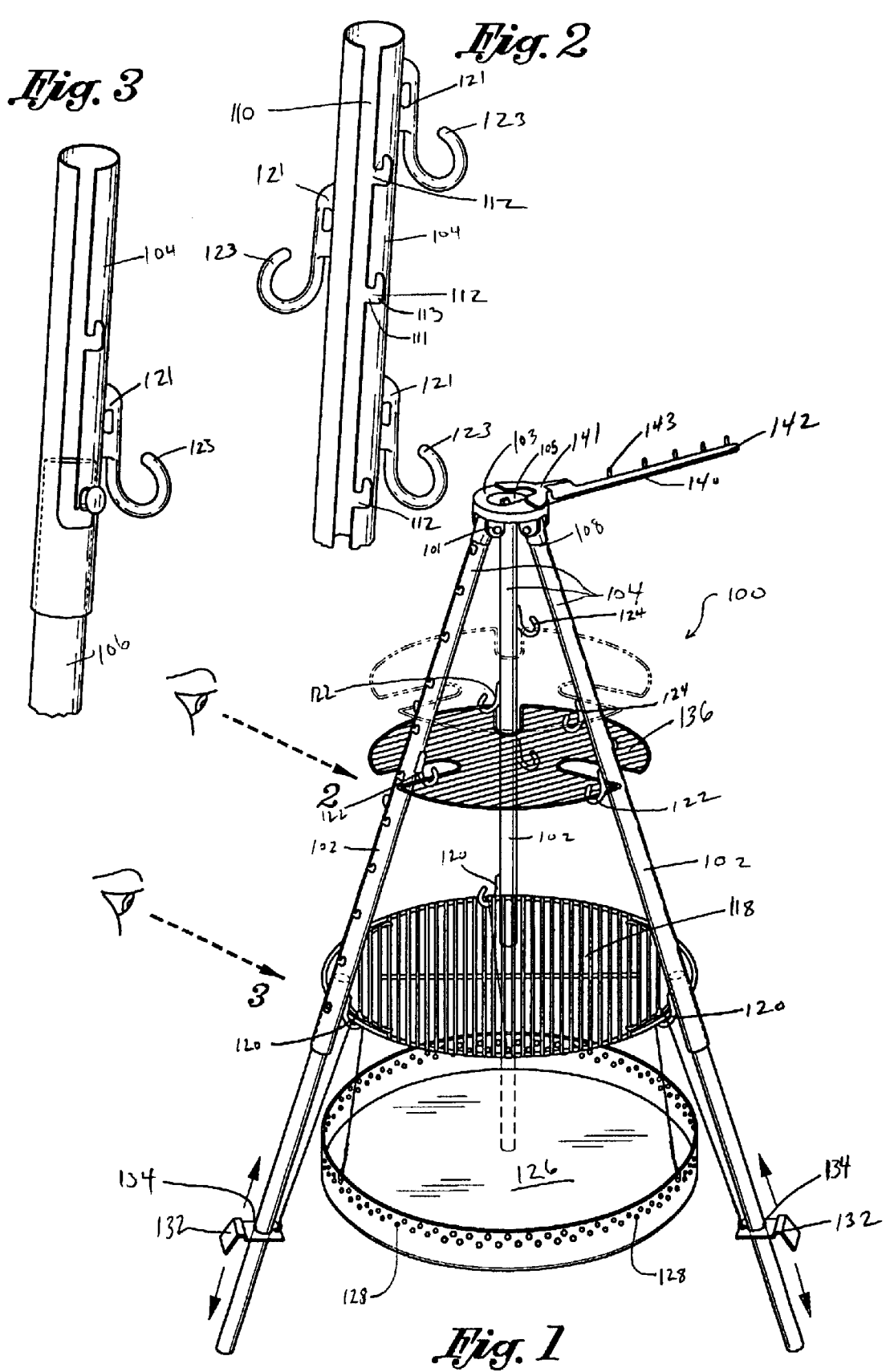

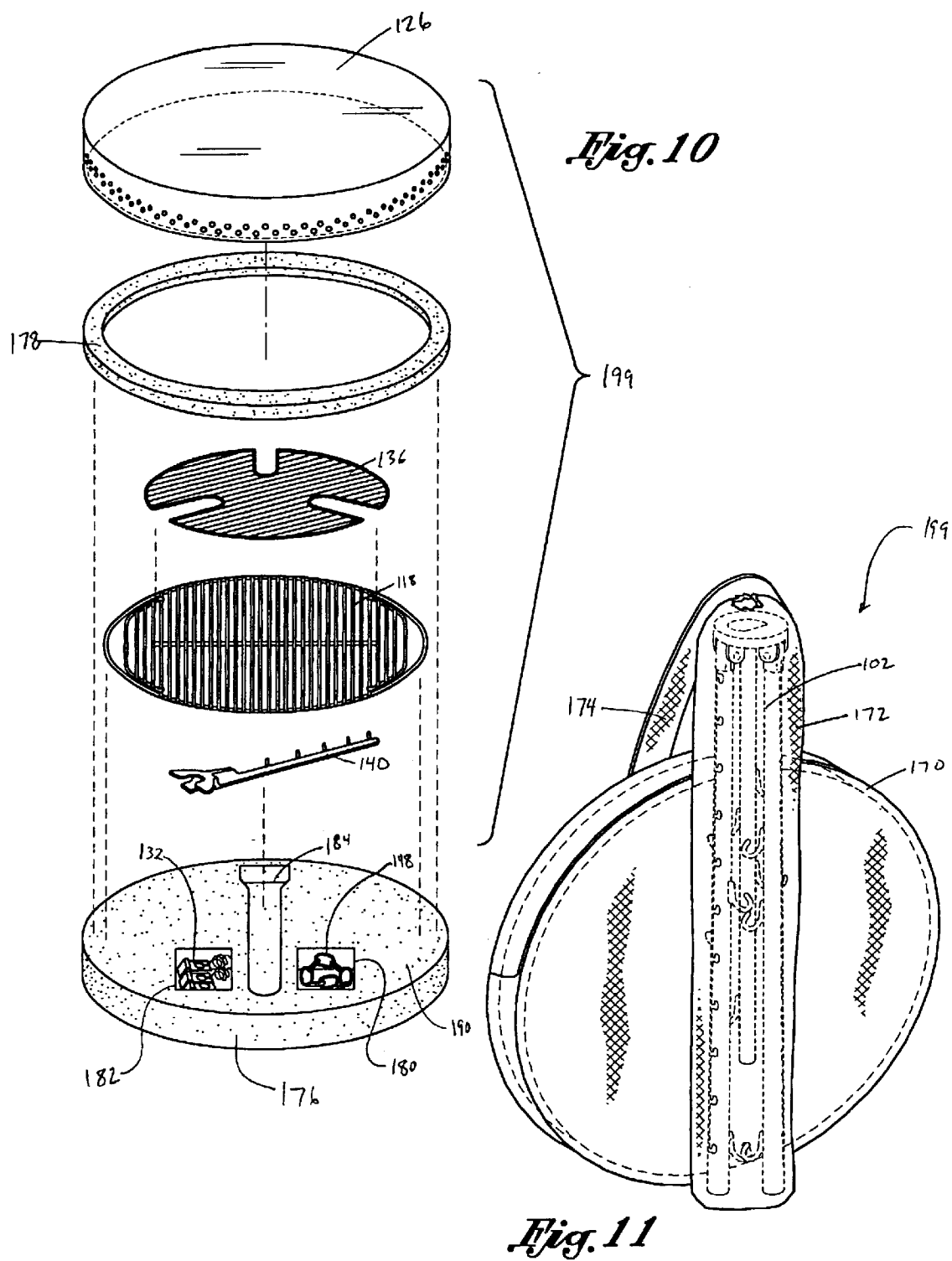

CAMP STOVE AND BARBEQUE SYSTEM

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The following generally relates to barbeque grills and, more specifically, to a collapsible, portable barbeque system that allows a user to employ a wider variety of outdoor camp stove cooking methods.

Many people cook food on barbeques and outdoor grills. Often, barbeque cooking takes place at home, on large, bulky barbeque grills. However, people sometimes barbeque away from home on smaller portable grills. For example, people cook on portable grills at tailgate parties, on camping trips, and the like.

For this reason, several portable barbeque grills have been developed with a variety of features. For instance, some portable grills are collapsible so that the barbeque can be made more compact for more convenient carrying. Other barbeques have adjustable legs so that the barbeque can be placed on uneven ground and still remain level. Still other barbeques incorporate potholders that can suspend cookware above the heat source to allow for a wider variety of cooking methods. Finally, alternative portable barbeques include a utensil retaining member to hold cooking utensils and keep them relatively dirt free when not in use. However, no prior art barbeque combines of all of these features into a single compact, portable camp stove barbeque system.

Furthermore, non-portable grills often include warming racks. These racks are surfaces separate from the primary cooking surface that can be used to keep food warm or to toast buns. However, prior art portable grills do not include warming racks. Thus, keeping food warm and/or toasting buns can be inconvenient without these warming racks.

Therefore, it is understood that there is an ongoing need for a collapsible, portable barbeque system that includes a grilling surface, a warming rack, a potholder, a utensil arm, and can operate with a variety of different heat sources. Such a barbeque system would advantageously allow a user to employ a wider variety of cooking methods as compared with other existing portable barbeques.

BRIEF SUMMARY OF THE INVENTION

In response to the above noted needs, there is disclosed herein a barbeque system of the present invention. The barbeque system is collapsible and comprises at least three legs joined at an attachment point and extending radially outward and downward therefrom. The legs define an axis of the barbeque system which extends through the attachment point and extends downward therefrom. In one general embodiment, the legs are extendable, and in a specific embodiment, each leg has a second member that is slidably attached inside a first member. Also, in another embodiment, each leg is hingedly attached at the attachment point.

The barbeque system further includes a grill attached to the legs and a heat source removably attached to the legs below the grill. The heat source can be a pan capable of holding hot coals or burning wood, or the heat source can be a propane burner. The pan and the propane burner can be moved up or down the axis of the barbeque system to change the intensity of the heat affecting the food. In another configuration, the heat source is removed and the barbeque system is positioned over a campfire.

Furthermore, the barbeque system includes a warming rack attached to the legs above the grill. In one embodiment, the warming rack can be moved up or down the axis of the barbeque system.

Also, the barbeque system has a potholder removably suspended from the attachment point and has a first end to which cookware can attach. In one embodiment, the axial position of the first end of the attached potholder can change.

Moreover, the barbeque system includes a utensil arm joined to the attachment point and extending outward therefrom. In one embodiment, the utensil arm is removably attached to the attachment point of the barbeque system.

In another embodiment, the barbeque system further comprises a carrying case into which the legs, grill, heat source, warming rack, potholder, and utensil arm can be positioned. The carrying case also includes a strap that can be slung around a user's shoulder for convenient transportation of the barbeque system.

As such, the barbeque system of the present invention combines numerous components to allow for a wider range of cooking methods. Also, the barbeque system can be easily transported for use while camping, at tailgate parties, or the like.

BRIEF DESCRIPTION OF THE DRAWINGS

These as well as other features of the present invention will become more apparent upon reference to the drawings wherein:

FIG. 1 is a perspective view of one embodiment of a barbeque system of the present invention;

FIG. 2 is a detail view of a portion of the leg of the barbeque system of FIG. 1;

FIG. 3 is a detail view of a portion of the leg of the barbeque system of FIG. 1;

FIG. 10 is an exploded view of a collapsed barbeque system; and

FIG. 11 is a perspective view of the barbeque system, collapsed, and contained within a carrying case.

DETAILED DESCRIPTION OF THE INVENTION

Figure 4:
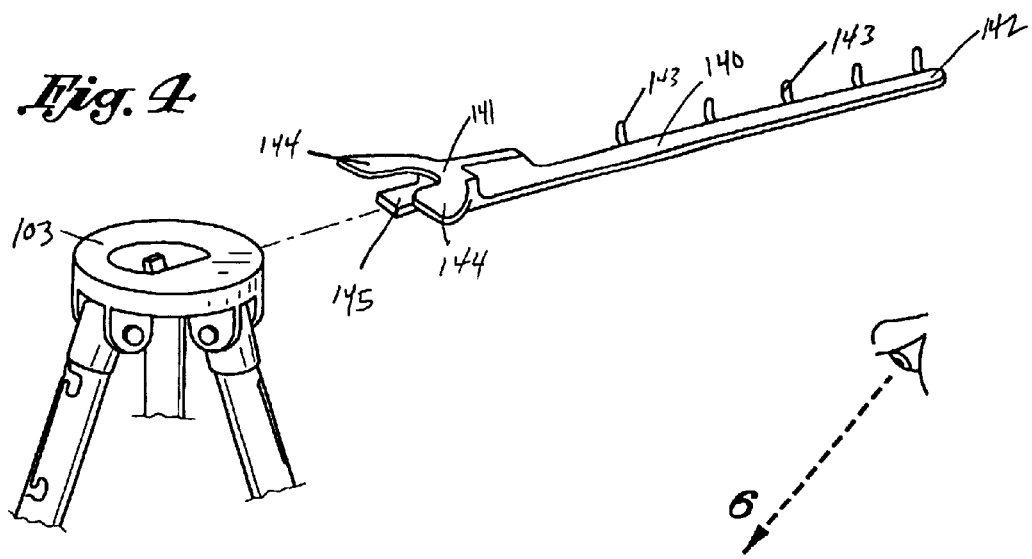
FIG. 4 is a detail view of the attachment point of the barbeque system of FIG. 1.

Referring now to the drawings wherein the showings are for purposes of illustrating preferred embodiments of the present invention only, and not for purposes of limiting the same, FIG. 1 depicts one embodiment of a barbeque system 100 of the present invention. The barbeque system 100 comprises a ring 103. The ring 103 is flat and round with an aperture 105 through its axis. The ring 103 also has a plurality of flanges 101, intermittently spaced around the underside of the ring 103. As will be discussed in greater detail below, the ring 103 provides attachment means for a variety of components in the barbeque system.

Also, the barbeque system 100 comprises a plurality of legs 102. In the embodiment shown, there are three legs 102, and all the legs 102 are hingedly attached to the flanges 101 of the ring 103. The legs 102 extend radially outward and downward from the ring 103. The legs 102 are the primary support means for the barbeque system 100.

In the preferred embodiment, the legs 102 are extendable. As such, the legs 102 each have a first member 104 (illustrated in FIGS. 1–3) and a second member 106 (illustrated in FIGS. 1 and 3).

The first member 104 is a hollow tube made out of metal in one embodiment. The typical first member 104 is hingedly attached to one pair of flanges 101 at a first end 108 and extends radially outward and downward therefrom. Each first member 104 has a slot 110 partially extending along its axis. Also, each first member 104 has a plurality of transverse notches 112 each having a first end 111 and a second end 113. Each transverse notch 112 extends circumferentially off of the groove 110 from the first end 111 of the transverse notch 112. The transverse notches 112 are spaced intermittently along the axis of the first member 104. Also, the first member 104 has a plurality of retaining notches 114, each connected to the second end 113 of the individual transverse notches 112 and extending upward along the axis of the first member 104.

Moreover, one embodiment of the first member 104 also includes a plurality of first hooks 120, second hooks 122, and third hooks 124. Each of the hooks 120, 122, 124 is a short piece of metal having a first end 121, which is welded to a respective leg 120, and a second end 123, which is bent upward toward the ring 103. Each first member 104 has one first hook 120, one second hook 122, and one third hook 124 in the embodiment shown. Collectively, the first hooks 120 are positioned near the bottom of each first member 104 such that the first hooks 120 are aligned in a plane that is largely parallel to the ring 103. The second hooks 122 are collectively positioned in a parallel plane above the first hooks 120, and the third hooks 124 are collectively positioned in a parallel plane above the second hooks 122. As will be described in greater detail below, the first, second, and third hooks 120, 122, 124 provide attachment means for different components of the grill system 100.

Like the first member 104, the second member 106 is a hollow tube made out of metal in one embodiment. The diameter of the second member 106 is slightly smaller than the diameter of the first member 104 such that the second member 106 can slide into the first member when their axes are aligned. As is specifically seen in FIG. 3, the second member 106 includes a post 116, which is shaped like a cylinder and extends transverse to the axis of the second member 106. The diameter of the post 116 is designed to fit within the groove 110, transverse notches 112 and retaining notches 114 of the first member 104.

Thus, in order to extend or retract a leg 102, the second member 106 telescopes (i.e., slides) into or out of the first member 104, and in doing so, the post 116 slides along the groove 110. Once the desired positioning is achieved, the user twists the second member 106 relative to the first member 104 such that the post 116 slides into the transverse notch 112 and then into the retaining notch 114. Once positioned, the second member 106 is selectively locked in position because the portion of the first member 104 surrounding the retaining notch 114 inhibits axial movement of the post 116.

Therefore, the legs 102 can be independently lengthened or shortened. As such, the grill system 100 is able to stand level on uneven ground, which is often encountered on campgrounds and the like. It is also noted that in this embodiment, a user can extend or retract an individual leg 102 by grabbing, twisting, and sliding opposing ends of the leg 102. Advantageously, a user is unlikely to get dirty during this adjustment because the areas grabbed are relatively distant from the typically dirty grill, etc.

As shown in FIG. 1, the barbeque system 100 further comprises a grill surface 118. The grill surface 118 is widely known in the art as a means of supporting food over a heat source. The grill surface 118 is attached to the barbeque system 100 via the first hooks 120. In other words, the grill surface 118 is positioned over the second ends 123 of the first hooks 120 to be supported thereon.

The barbeque system 100 further comprises a heat source 126. In the embodiment shown in FIG. 1, the heat source 126 is a pan used to hold hot barbeque briquettes, burning firewood, or the like. The heat source 126 is axially positioned below the grill surface 118 so as to provide heat to the grill surface 118 for cooking food.

There are a plurality of holes 128 extending through the heat source 126. The holes 128 allow for greater convection of air across the heat source 126 so that articles therein burn more effectively. In one embodiment, a plurality of suspension cables 130 are attached through some of the holes 128, extend upward and over the grill surface 118, and then extend downward to attach to retainers 132. Each retainer 132 preferably comprises a bent piece of sheet metal in one embodiment with a hole 134. The hole 134 has a diameter slightly larger than the diameter of the second member 106 of the leg 102 so that the second member 106 can fit through the hole 134. When the axis of the hole 134 is approximately aligned with the axis of the second member 106, the retainer 132 is able to slide up and down the respective second member 106. However, when the axis of the hole 134 is not substantially aligned with the axis of the second member 106, friction between the edge of the hole 134 and the second member 106 inhibits movement of the retainer 132. Preferably, the weight of the heat source 126 is sufficient to tilt the retainers 132 so that the axes of the holes 134 and second members 106 do not align, and the heat source 126 stays suspended in place. However, if the user chooses to adjust the height of the heat source 126, then the user manually tilts each retainer 132 and moves the same up or down the second member 106. As such, the retainers 132 provide a convenient means of adjusting the height of the heat source 126 to thereby change the heat intensity near the grill surface 118.

In the embodiment shown in FIG. 1, the barbeque system 100 further comprises a warming rack 136. The warming rack 136 is circular and has a grill-like surface in one embodiment, but it has a smaller diameter than the grill surface 118. In the embodiment shown, the warming rack 136 has a plurality of slots 138. Each slot 138 has a width that is approximately equal to the diameter of the first members 104 of the legs 102, and each slot 138 extends radially inward from a different circumferential location. The slots 138 allow clearance for the legs 102 when the warming rack 136 is positioned above the grill surface 118 as will be discussed below.

The warming rack 136 can be removably attached to the legs 102 via the set of second hooks 122 (shown in solid lines in FIG. 1) or third hooks 124 (shown in broken lines in FIG. 1). In other words, the warming rack 136 is adjustably positioned over the second ends 123 of the second or third hooks 122, 124 to be supported thereon. As such, the height of the warming rack 136 can be easily adjusted higher or lower, depending on whether the second hooks 122 or third hooks 124 are utilized. Food on the warming rack 136 can receive heat from the heat source 126, but relatively little heat is received because of the distance between the heat source 126 and the warming rack 136. Thus, the warming rack 136 advantageously provides a convenient surface on which to toast buns or to keep food warm.

As is also shown in FIG. 1 and FIG. 4, the barbeque system 100 further comprises a utensil arm 140. In one embodiment, the utensil arm 140 is a flat, elongate member having a first end 141 and a second end 142. As shown in FIG. 4, the first end 141 of the utensil arm 140 has two upper tongues 144 and one lower tongue 145. The upper tongues 144 are each flat flanges extending off of the upper side of the first end 141. The lower tongue 145 is similarly a flat flange extending off of the lower side of the first end 141. The vertical spacing between the upper and lower tongues 144, 145 is approximately equal to the thickness of the ring 103. As such, the utensil arm 140 can be removably attached to the barbeque system 100 by sliding the upper and lower tongues 144, 145 above and below the ring 103, respectively. The utensil arm 140 also comprises a plurality of hooks 143 spaced intermittently from the first end 141 to the second end 142. Each hook 143 extends transversely from the axis of the utensil arm 140. The hooks 143 provide a means of hanging cooking utensils. As such, the utensil arm provides a convenient location to place cooking utensils when not in use.

Figure 6:
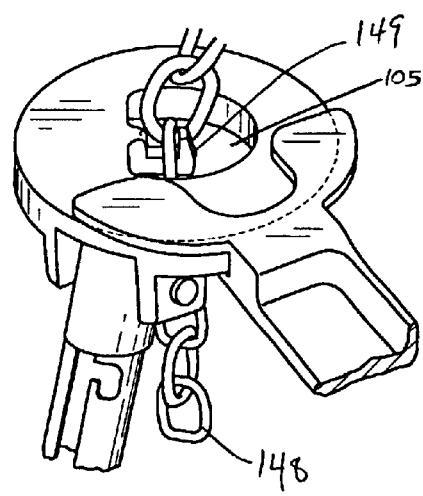
FIG. 6 is a detail view of the attachment point of the barbeque system of FIG. 5.
Figure 5:
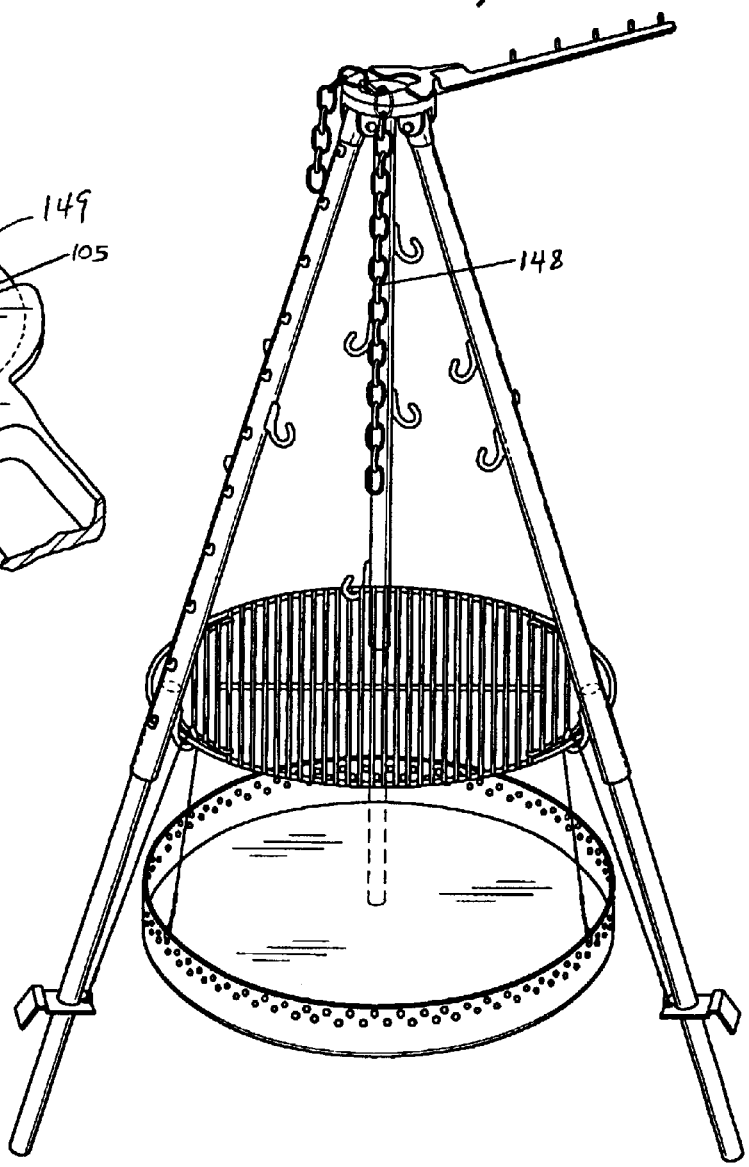
FIG. 5 is an isometric view of another embodiment of the barbeque system of the present invention.

Turning now to FIGS. 5 and 6, another embodiment of the barbeque system 100 is depicted. The barbeque system 100 shown is largely similar to the previous embodiments, except that the warming rack 136 is not present, and a potholder 148 has been attached. In the embodiment shown, the potholder 148 is a chain that is suspended from the ring 103. More specifically, as shown in FIG. 6, the ring 103 includes a hook 149 extending radially inward from the edge of the aperture 105, and the potholder 148 is suspended from the hook 149. Although not shown, pots and other containers can be attached to the potholder 148 to be suspended above the heat source 126 when cooking. It is noted that the height of the pot or other container could be adjusted relative to the heat source 126 simply by changing the link of the potholder 148 that is attached to the hook 149. As such, liquids and other food to be cooked in a container can be heated by the barbeque system conveniently.

Figure 7:
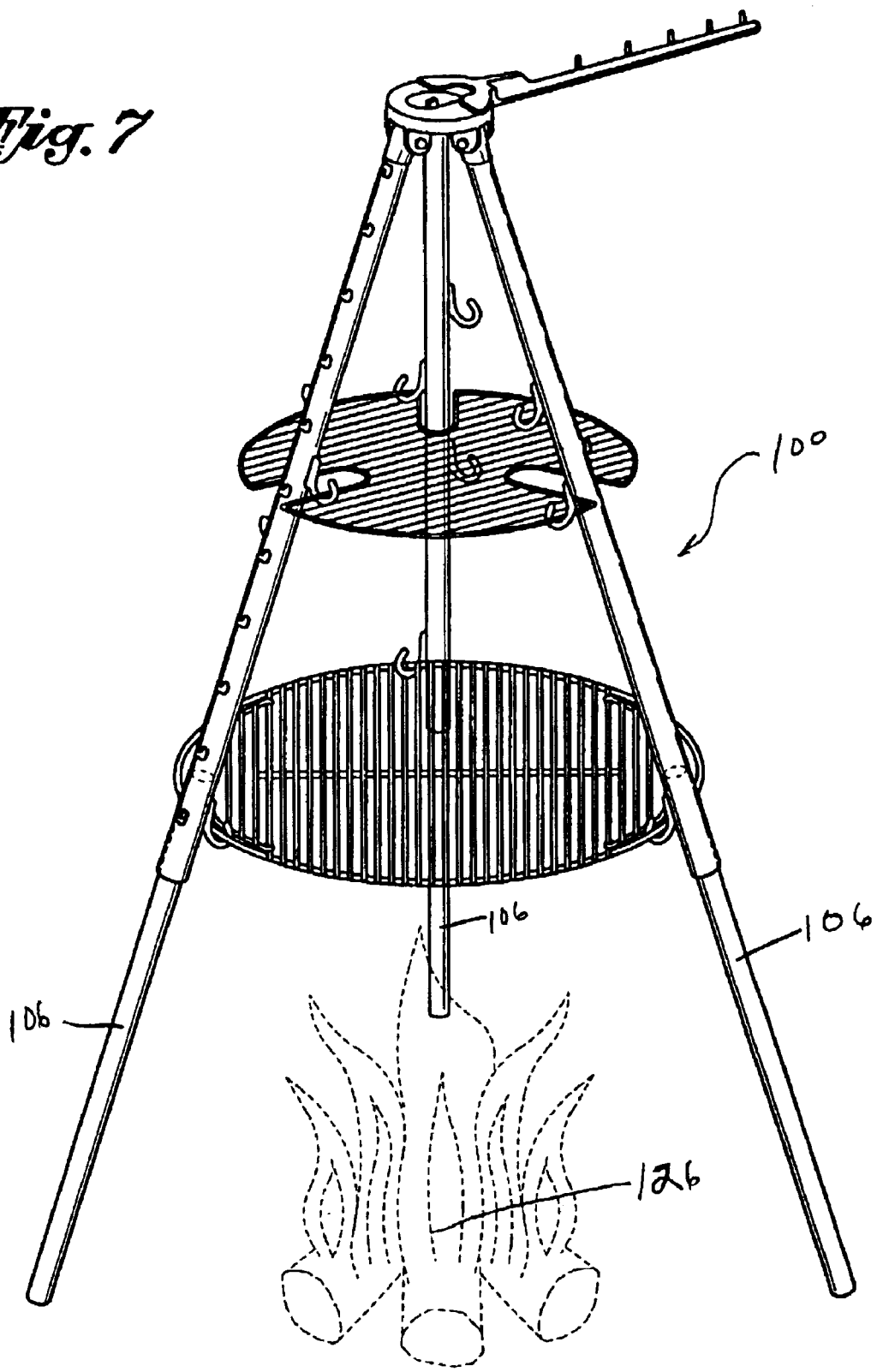
FIG. 7 is a perspective view of another embodiment of the barbeque system of the present invention.

Turning now to FIG. 7, another embodiment of the barbeque system 100 is shown, similar to embodiment of FIG. 1, but for use with a different heat source 126. In this embodiment, the heat source 126 is a campfire. As stated above, the heat source 126 of FIG. 1 can be removed by aligning the holes 134 of the retainers 132 with the axis of the second members 106. This allows the retainers 132 to slide down and off the second member 106. Once removed, the barbeque system 100 can be placed over the campfire to utilize its heat for cooking. Thus, this embodiment of the barbeque system 100 is more versatile because different heating sources 126 can be utilized.

Figure 8:
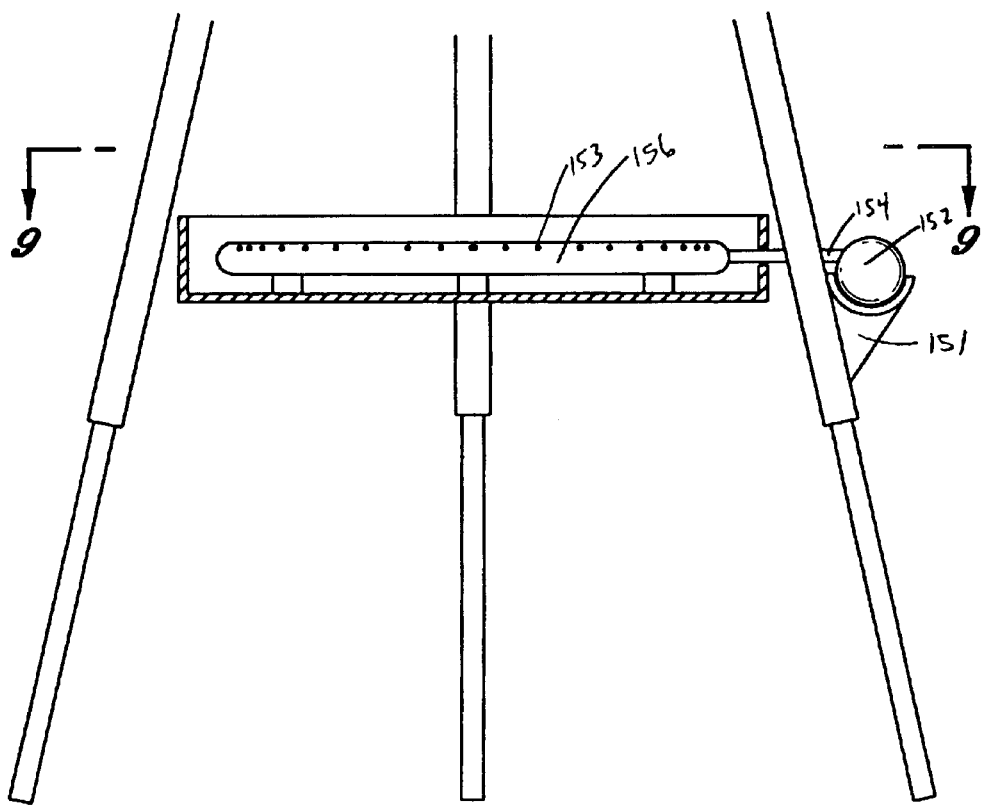
FIG. 8 is a front view of a portion of another embodiment of the barbeque system of the present invention.
Figure 9:
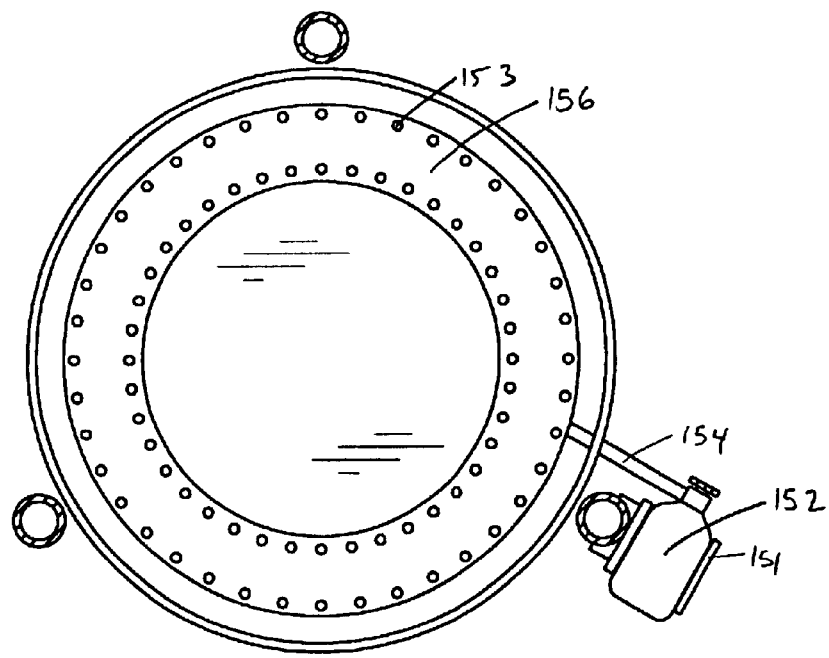
FIG. 9 is a top view of the barbeque system of FIG. 8 taken along the line 9—9.

Turning now to FIGS. 8 and 9, an alternative embodiment of the barbeque system 100 is depicted. In the embodiment shown, the heat source 126 is powered by a propane gas canister. This embodiment of the heat source 126 includes a conventional propane tank 152, a hollow delivery tube 154, and a conventional fire ring 156. The tank 152 includes a gas valve and is supported on a cradle 151 attached to one of the legs 102. The fire ring 156 is a circular hollow ring supported by the pan shown in FIG. 1. The delivery tube 154 is a hollow tube connecting the propane tank 152 to the fire ring 156 so as to allow pressurized propane to leave the tank 152 and enter the fire ring 156. Furthermore, the fire ring 156 has a plurality of small apertures 153 spaced intermittently around the top of the fire ring 156 that allow the propane to escape the fire ring 156. Once propane is flowing from the tank 152 to the fire ring 156, the propane can be ignited as it leaves the apertures 153. This creates heat which can cook food on the grill surface 118 lying there above. Thus, this embodiment demonstrates the versatility of the barbeque system 100 because it can be utilized with an even wider variety of heat sources 126.

In the preferred embodiment, the barbeque system 100 is collapsible and portable. FIGS. 10 and 11 depict an embodiment of a collapsed barbeque system 100 positioned within a carrying case 199 for portability. As shown in FIGS. 10 and 11, one embodiment of the carrying case 199 comprises a disk 176, which is a short, cylindrical member preferably made out of foam with a diameter approximately as large as the grill surface 118. The foam disk 176 also has a top side 190. The foam disk 176 includes a first cavity 180 and a second cavity 182, which are rectangular cutouts located in the top side 190 and extending partially through the thickness of the foam disk 176. The potholder 148 is placed within the first cavity 180, and the retainers 132 are placed within the second cavity 182 so that the potholder 148 and retainers 132 will be secured during transportation. Furthermore, the foam disk 176 comprises a third cavity 184, which is an elongated cutout cut in the shape of the utensil arm 140 and located in the top side 190. The utensil arm 140 is secured within the third cavity 184.

Next, the grill surface 118 and the warming rack 136 are stacked together and placed on the top side 190 of the foam disk 176. Then, a foam ring 178, a ring with a diameter as large as the foam disk 176 and made out of foam, is placed atop the warming rack 136 and grill surface 118. Finally, the heat source 126 (in this embodiment, the pan for coal or wood) is placed over the other components. In one embodiment, the components are sized such that the stacked foam disk 176, grill surface 118, warming rack 136, and foam ring 178 can all fit substantially inside the heat source 126. As will be described below, this configuration of the collapsed components is advantageously compact for easier storage and transport.

As shown in FIG. 11, the carrying case 199 further comprises a first bag 170. In one embodiment, the first bag 170 is generally shaped like a short, hollow cylinder and is made out of a soft cloth, such as canvas. Preferably, the first bag 170 includes a zipper (not shown) or other similar means which provides closable access to the interior of the first bag 170. The first bag 170 is sized to be able to hold the heat source 126 and foam disk 176 with the other components stacked therebetween as shown in FIG. 10.

The carrying case 199 also comprises a second bag 172 as shown in FIG. 11. The second bag 172 is long, cylindrical, and hollow and is made out of a soft cloth like canvas in one embodiment. The second bag 172 is preferably able to contain the legs 102 when the first members 104 are all pivoted about their hinges toward the center of the ring 103 and the second members 106 are retracted inside the first members 104. Preferably, the second bag 172 includes a zipper or a draw string (not shown) or other similar means which provides closable access to the interior of the second bag 172.

Finally, this embodiment of the carrying case 199 includes a strap 174 which is a long, flat piece of cloth that is attached to both the first bag 170 and the second bag 172. Preferably, the attachment between the first and second bags 170, 172 leaves enough slack so that a user can position the strap 174 over a shoulder for conveniently carrying the entire barbeque system 100 within the carrying case 199.

In summary, the barbeque system 100 herein disclosed allows a user to grill on the grilling surface 118, warm food on the warming rack 136, or cook with pots using the potholder 148. Also, the barbeque system 100 can utilize a variety of heat sources 126 including ignited coal, wood, or propane. Thus, the user can advantageously employ a variety of cooking methods, all with the same barbeque system 100.

Furthermore, the inclusion of the utensil arm 140 advantageously makes cooking more convenient. This is because the cooking utensils can be placed nearby when not in use.

Moreover, several components of the barbeque system 100 can be adjusted. For instance, the legs 102 can be extended or retracted, thereby allowing the barbeque system 100 to be placed level, even when on uneven ground. Also, the height of the heat source 126 and the warming rack 136 can be adjusted. These adjustable components advantageously allow a user to more effectively control the cooking rate occurring on the barbeque system 100.

Finally, the barbeque system 100 is collapsible for more compact storage, and the barbeque system 100 is portable, thereby allowing the user to barbeque in a wider variety of locales.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process may be implemented by one of skill in the art in view of this disclosure.

What is claimed is:

1. A collapsible barbeque system, comprising:
    at least three legs joined at an attachment point and extending radially outward and downward therefrom, the at least three legs defining an axis of the barbeque system which extends through the attachment point and extends downward therefrom;
    a grill attached to the at least three legs;
    a heat source suspended from the at least three legs below the grill and selectively positionable at differing axial positions relative to the grill;
    a warming rack attached to the at least three legs above the grill;
    a potholder removably suspended from the attachment point and having a first end to which cookware can attach; and
    a utensil arm joined to the attachment point and extending outward therefrom.

2. The barbeque system of claim 1, wherein the at least three legs each are extendable and retractable.

3. The barbeque system of claim 2, wherein each of the at least three legs has a second member slidably attached inside a first member.

4. The barbeque system of claim 1, wherein the at least three legs are hingedly attached at the attachment point.

5. The barbeque system of claim 1, wherein the heat source is selected from a group consisting of:
    a pan capable of holding coal attached to the at least three legs below the grill; and
    a propane burner attached to the at least three legs below the grill.

6. The barbeque system of claim 1, wherein the axial position of the heat source can be manually varied.

7. The barbeque system of claim 1, wherein the axial position of the warming rack can be manually varied.

8. The barbeque system of claim 1, wherein the axial position of the first end of the attached potholder can be manually varied.

9. The barbeque system of claim 1, wherein the utensil arm is removably attached to the attachment point.

10. The barbeque system of claim 1, further comprising a carrying case into which the at least three legs, grill, heat source, warming rack, potholder, and utensil arm can be positioned.

11. The barbeque system of claim 10, wherein the carrying case includes a strap.

* * * * *